(No Model.)
W. W. VAUGHN.
JACK SCREW.
No. 310,100. Patented Dec. 30, 1884.
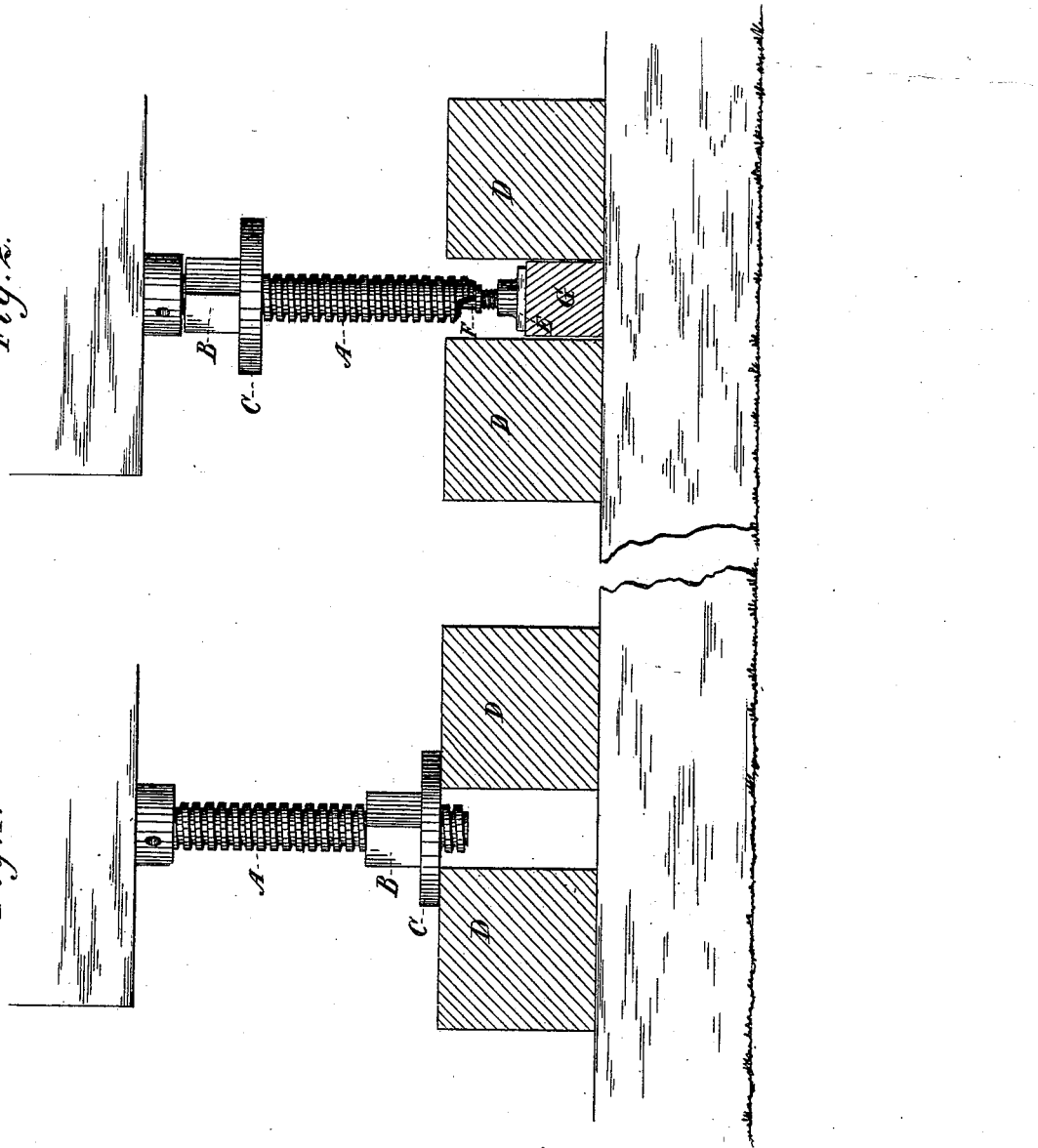

UNITED STATES PATENT OFFICE.

WALTER W. VAUGHN, OF STOCKTON, CAL., ASSIGNOR OF TWO-THIRDS TO ASA CLARK AND ORRIN G. LANGMAID, BOTH OF SAME PLACE.

JACK-SCREW.

SPECIFICATION forming part of Letters Patent No. 310,100, dated December 30, 1884.

Application filed September 18, 1884. (No model.)

*To all whom it may concern:*

Be it known that I, WALTER W. VAUGHN, of the city of Stockton, in the county of San Joaquin and State of California, have invented an Improvement in Operating Jack-Screws; and I hereby declare the following to be a full, clear, and exact description thereof.

My invention relates to a means for operating screws by which houses or other heavy articles are to be raised by successive operation with screws; and it consists in a mechanism by which the screw may be supported after it has been raised to its highest point, so that the nut may be relieved from its pressure and "fleeted" or run up to the top of the screw, where it will again be supported by new timbers, so that the screw may be turned up through the nut and the building raised another length, the operation being continuous without removing either screw or nut.

Referring to the accompanying drawings for a more complete explanation of my invention, Figure 1 is a view of my apparatus, showing the screw at its highest point. Fig. 2 shows the screw supported from below and the nut to be moved upward.

In the raising of buildings or other heavy objects it has been a practice to either work with two sets of screws, one of which may be run up to the greatest height, and timbers are put in and another set put on, or the weight may be lowered upon these timbers and the screws removed when only one set are used, and set upon new blocks for another raise. In some cases a separable nut has been used, which may be opened and moved on the screw after the screw has been turned through it to the greatest distance. In the present case A is the screw, the upper end of which is suitably constructed to support a weight which is to be raised, and B is a nut through which the screw turns, having a wide flange or collar, C, upon it, which is adapted to rest upon the timbers D of the trestles which are used in raising the weight. These being in place, and the screw-nut being turned up so as to be near the upper end of the screw, the proper timbers, D, are placed beneath the flange C, so as to support it, and the screw is then turned around, moving through the nut until it has reached its highest point.

E is a standard, having a vertical projection, F, which is adapted to enter the lower end of the screw-shank, this being made hollow for the purpose. The base of the standard E is placed upon suitable supporting-timbers, G, and the nut F caused to enter the bottom of the screw, either by being turned up within the standard, (in which case it would have screw-threads for such purpose,) or if it be stationary the standard itself would be wedged up to the proper point on its supporting-timbers. This being done, the screw A will be turned downward a short distance through the nut B until its lower end rests upon the projection F, and where its whole weight will be supported. The nut B, thus being relieved from pressure, can be run up to the top of the threads of the screw A, and new timbers or trestles D laid across and built up until they are just beneath the flange C of the nut. The screw A can thus be turned upward again to its highest point, and the operation repeated. By this operation it will be seen that one screw or set of screws may be moved upward as far as possible through the nut and then supported upon the standard E until the nut can be run up to the top, and when that is supported the screw advanced until the highest desired point is reached; and this can be done without in any way removing or changing the position of the screws until the work is completed.

Having thus described my invention, what I claim as new, and desire to secure by Letters Patent, is—

1. A flanged nut, B, and screw A, turning through said nut, having its upper end adapted to support a weight, which may be raised by turning the screw within the nut, together with the standard or base E, having the upwardly-projecting extension F, fitted to support the lower end of the screw while the nut is being raised upward, substantially as herein described.

2. A nut having a flange which may be supported upon timbers or trestles, and a screw constructed to turn within said nut, having the upper end formed to support and elevate a weight, together with a base or standard having a movable or adjustable extension, F, which is fitted to the lower end of the screw, whereby the latter may be supported while the nut is being moved upward upon it, substantially as described.

In witness whereof I have hereunto set my hand.

WALTER W. VAUGHN.

Witnesses:
S. H. NOURSE,
H. C. LEE.